US008732477B2

(12) United States Patent
Osborn et al.

(10) Patent No.: US 8,732,477 B2
(45) Date of Patent: May 20, 2014

(54) GRAPHICAL IMAGE AUTHENTICATION AND SECURITY SYSTEM

(75) Inventors: Steven L. Osborn, Portland, OR (US);
Nicholas A. Davis, Tulsa, OK (US);
James L. Sontag, Portland, OR (US);
Joel Norvell, Portland, OR (US)

(73) Assignee: Confident Technologies, Inc., Solana Beach, CA (US)

( * ) Notice: Subject to any disclaimer, the term of this patent is extended or adjusted under 35 U.S.C. 154(b) by 1077 days.

(21) Appl. No.: 12/247,209

(22) Filed: Oct. 7, 2008

(65) Prior Publication Data

US 2009/0077653 A1 Mar. 19, 2009

Related U.S. Application Data

(63) Continuation-in-part of application No. 11/420,061, filed on May 24, 2006, now abandoned.

(51) Int. Cl.
*G06F 21/00* (2013.01)

(52) U.S. Cl.
USPC .......................................................... 713/182

(58) Field of Classification Search
None
See application file for complete search history.

(56) References Cited

U.S. PATENT DOCUMENTS

| | | | |
|---|---|---|---|
| 5,928,364 A | | 7/1999 | Yamamoto |
| 6,981,016 B1 | | 12/2005 | Ryan |
| 7,653,931 B1 * | | 1/2010 | Peterson et al. ............. 726/2 |
| 2002/0083347 A1 | | 6/2002 | Taguchi |
| 2002/0188872 A1 | | 12/2002 | Willeby |
| 2003/0210127 A1 * | | 11/2003 | Anderson ................. 340/5.27 |
| 2004/0172564 A1 | | 9/2004 | Federova et al. |
| 2005/0010768 A1 * | | 1/2005 | Light et al. ................. 713/168 |
| 2006/0248344 A1 * | | 11/2006 | Yang ........................... 713/183 |
| 2007/0023506 A1 | | 2/2007 | Lagadec et al. |
| 2007/0130618 A1 | | 6/2007 | Chen |

FOREIGN PATENT DOCUMENTS

| | | |
|---|---|---|
| JP | 11-345206 A1 | 12/1999 |
| KR | 2002-0026636 A1 | 4/2002 |
| KR | 2004-0047155 A1 | 6/2004 |
| KR | 2004-0067123 A1 | 1/2006 |
| WO | 02-054199 A1 | 7/2002 |
| WO | 2006-064241 A2 | 6/2006 |

OTHER PUBLICATIONS

Rachan Dhamija, et al. "Deja Vu: A User Study Using Images for Authentication", Proceedings of the 9th USENIX Security Symposium, 2000.

* cited by examiner

*Primary Examiner* — Brandon Hoffman
(74) *Attorney, Agent, or Firm* — San Diego IP Law Group, LLP

(57) ABSTRACT

A method and system for protection of and secure access to a computer system or computer network from a portable device. The method includes the steps of receiving a first login account identifier, such as a user name from a user in communication with the computer system or network. A determination is made if the user is recognized and enrolled from the first login account identifier. If the user is recognized, a series of randomly generated visual images is displayed including one visual image from an image category which has been pre-selected by the user upon enrollment. An image category identifier is randomly assigned to each visual image in the series. An image category identifier is entered and received. If the login account identifier and the image category are validated, access is permitted to the computer system or network from the portable device.

55 Claims, 5 Drawing Sheets

Username: ☐
Password: ☐

Fig. 4

GRAPHICAL IMAGE AUTHENTICATION AND SECURITY SYSTEM

CROSS REFERENCE TO RELATED APPLICATIONS

This application claims priority of U.S. patent application Ser. No. 11/420,061, filed May 24, 2006, the contents of which are incorporated fully herein by reference.

FIELD OF THE INVENTION

The present invention is directed to a method and system of authenticating identity to a computer system. In particular, the present invention is directed to a graphical image identity authentication system for use on a computer system.

BACKGROUND OF THE INVENTION

Computer networks, particularly those with global reach such as the Internet, have greatly influenced the way that individuals, companies and institutions conduct transactions, and store and retrieve documents, images, music, and video. Convenience, ease of use, speed, and low overhead costs are contributing factors to the widespread use of the Internet for purchasing goods as well as conducting confidential transactions. Entire industries have emerged as a result of the evolution of the Internet.

Secure access to computer systems and computer networks has been traditionally guarded with a username and password pair. This requires the user to protect the username and password from unauthorized use. If the username and password are not protected, accounts and files can be compromised. Unfortunately, a number of rogue individuals and organizations have emerged that are dedicated to fraudulently obtaining confidential information for unauthorized or criminal activities.

A pervasive tool used in obtaining confidential information is keystroke-logging software, which constitutes a program that monitors and records what users type on their computers. Such software often comprises the payload of viruses, worms, Trojan horses, and other forms of malware. Keystroke-logging software can reveal what a user is typing on a computer without the user's knowledge of this event occurring.

Companies and institutions routinely use keystroke-logging software to monitor employee activity. Also, families may use these types of programs to monitor children's online activities. The widespread availability of this type of software, however, has lead to unauthorized or criminal use, resulting in the alarming rate of identity theft seen throughout the world.

Prime targets for these attacks are financial institutions, as more and more consumers and businesses use electronic methods for purchasing and making payments. According to the American Banker's Association, cash and checks now account for only 45 percent of consumer's monthly payments, down from 57 percent in 2001, and 49 percent in 2003. The trend is clearly in favor of electronic transactions, providing a wider field for identity theft.

Login information may also be "heard" by sophisticated analysis of the distinct sounds made by different keys. An inexpensive microphone near a keyboard can reveal most of what is being typed with a surprising degree of accuracy (http://www.schneier.com/blog/archives/2005/09/snooping_on_tex.html). The present invention thwarts attempts to record the successful completion to the login process, as the keystrokes typed cannot be linked to the user's true authentication parameters.

Login information is also vulnerable to simple spying or "shoulder-surfing", as a person with malicious intent watches an unsuspecting user sign into his or her account. The present invention employs a method that significantly reduces the likelihood of a successful shoulder-surfing style of attack.

The rise in popularity of portable hand-held Internet devices creates a need for these security issues to be directly addressed by a security system tailored for the limitations and security challenges associated therewith. As these devices are often used in places that are more public and less secure, "shoulder-surfing" is more likely.

Portable hand-held Internet devices also can be difficult to use to enter passwords, as keyboards are often very small on such devices and use of a phone keypad to enter passwords may cause error. Therefore, simplification of authentication input is desired while maintaining or increasing user security.

Additional security mechanisms are necessary in addition to the username/password paradigm to provide stronger identity authentication. There have been various other attempts do so.

Enterprises and institutions are using costly physical devices to identify legitimate customers and users. The existing devices generate a unique pass code for each user every 30 to 60 seconds. If an attacker manages to intercept a user ID and password, the information cannot be used to access the site without an additional authentication identifier displayed by the device. The devices significantly reduce instances of identity or information theft, but present challenges for both the institutions and individual users.

The enterprise may meet with consumer resistance in implementing use of the physical device. If the user does not have the device, he or she cannot gain access to the site. Besides the tremendous initial cost of purchasing the physical devices and implementing the new system, if the device is lost, stolen, or damaged, the enterprise will incur even more significant costs. In the context of business use of the device, the company incurs the cost of lost productivity from a worker who cannot access company information, as well as the cost of replacing the actual device. In the context of consumer use, if the consumer cannot access his or her accounts because of a lost device, the direct costs, and more significantly the indirect costs incurred by the enterprise to assist the consumer in gaining access far outweighs the advantages of using the device system.

In U.S. Pat. No. 5,559,961, Blonder provides a solution for utilizing graphical passwords. The framework described displays a static image in which the user touches predetermined areas of the screen, called "tap regions," in a particular sequence. As the user taps various areas on the display, the regions lapped are successively removed from the screen. These regions of the screen, and the order of the sequence they are tapped, are chosen by the user during an initial enrollment phase. The sequence and regions of taps is stored in the system as the user's password. One shortcoming of this solution is the likelihood of a shoulder-surfing attack: once an attacker views a user entering the sequence by touching areas of the screen, he or she is then easily able to replicate the sequence to successfully gain access to the user's account.

U.S. Patent Application Publication No. 2003/0191947 to Stubblefield uses inkblots as images for authentication of a user's identity when logging into computer systems. The authentication method described in this patent provides for a display of a random sequence of inkblots that the user has identified when he or she enrolled his or her login information. One drawback to this process stems from the identification of the inkblot. Although the user is required to identify and verify the alphanumeric text associated with the inkblots in the enrollment process, the ineffable nature of inkblots will cause consumers problems in remembering the code for their inkblot selections. A frustrated user will simply save their password information on their computer, write the information down, or enter incorrect password information, which defeats the security offered by this system. Also, this process is very intimidating for users, especially those who are neophyte users, because the inkblot is easily misconstrued as a myriad of different objects. The inkblot is just that: a blot on a screen the user will associate with a real world object. If that user misinterprets or forgets the association they have made with the inkblot they are denied access to their system. More importantly, the sequence process significantly increases login time for users. Currently, users are demanding more secure login techniques, but they desire to maintain the same level of convenience that they currently enjoy with the username/password login process. This authentication technique does not provide the ease of use that consumers desire.

U.S. Patent Application Publication No. 2004/0230843 to Jansen, which is a login authentication process using a sequence of images selected by the user, illustrates the potential of image-based authentication in protecting users from identity theft. The authentication method described in this patent application begins with the user selecting an image theme, such as animals, and then selecting a sequence of images within the image theme that becomes the password (e.g. if the category chosen is animals, one possible sequence is horse, cat, dog, cat, cat, horse). The success of the login process is predicated on the user's ability to replicate the sequence of images he or she has chosen within the image theme. In other words, the user must memorize the proper sequence. One drawback appears to be the complex nature of the sequence process. As defined in the patent application, if a user feels that he or she will be unable to remember the password, the user will simply write down the password so that recall becomes unnecessary. Also, because the images are typically static (the user can elect to "shuffle" images between login attempts, but most will likely stay with the simple default configuration), software can be created to automate the process. In this scenario the authentication requires no human interaction to complete the login, which tremendously decreases the level of security provided. Although the positions of the images can be shuffled within the grid, the fact that they are static means that shuffling only prevents attackers from guessing the likely placement of the sequence, not the images themselves. Moreover, the traditional text password is completely removed from the login process, meaning that the security offered in this solution is only single layer, whereas authentication processes that complement the existing login process provide multiple levels of security.

U.S. Patent Application Publication No. 2005/0268100 and Publication No. 2005/0268101 to Gasparini et al. discloses two way authentication including images which serve as customization information so that an entity can authenticate itself to a user, but is otherwise dissimilar.

Because of these noted shortcomings, an improved system and method is needed to create password values that are both exceedingly difficult for an intruder to compromise, while simultaneously easy for a user to apply and maintain.

SUMMARY OF THE INVENTION

The present invention provides a system and method for the secure identity authentication to a computer system. It is a further object and purpose of the present invention to provide an authentication and security system, which requires graphical discernment of one or more image categories from a series of distinct visual images.

The present invention provides an enrollment mechanism for new users. During enrollment, the user will be required to select a series of one or more image categories, which will serve as the user's authentication sequence.

The present invention requires the user to input a username at the point of user login. After validating the username, a series of images corresponding to the pre-defined categories will be displayed. One image from each category will appear at a random location within the series. If the number of available categories exceeds the number of image positions in the series, the displayed categories may be selected from the pool of available categories.

The present invention overlays each image with a randomly generated sequence of one or more characters. This sequence is known as an "image key" or "image identifier". Within the image series, the user will identify the images corresponding to the pre-selected authentication sequence, and input each associated image identifier in the provided input field.

The present invention will authenticate the identity of the user by matching the image (identifiers) input by the user with the correct image identifiers(s) derived from the pre-chosen authentication sequence.

The present invention is immune from attacks using keystroke loggers. The image identifier for each image is a randomly generated sequence of one or more characters. The mapping between the image identifier and the image category is established by the authentication mechanism. The user ascertains that mapping by graphical discernment of the images. The authentication sequence of the user is input by the user using the randomly generated image identifier. Without the images displayed, the text entered by the user will be effectively random characters and will not provide clues to the authentication sequence of the user. Attackers will not be able to ascertain the image category authentication sequence of a user by capturing keystrokes.

The present invention mitigates the risk of attacks involving shoulder surfing. Traditional username/password authentication systems could be compromised if attackers visually discern the keystrokes entered by the user during the login process. The present invention requires the attacker to visually discern both the keystroke entered by the user in the form of image identifier as well as the graphical discernment of the images for the mapping between image identifier and the image category. The authentication sequence of the user is compromised only if both forms of information are captured. This increases the difficulty in successfully executing the attack.

In terms of brute force attacks, the search space for the present invention is equal to:

$$(g)^n$$

Where g is the number of elements in the image series and n is the length of the authentication sequence. A reasonable implementation might call for a series size of 16 and an authentication sequence length of 3. This would result in a brute force search space of:

$$16^3=4096$$

On average, the brute force attack would succeed after 2048 tries. While this seems like a low number in the context of security algorithms, risk is mitigated by the nature of the algorithm as well as by additional safeguards. The mapping between the image identifier and the image category requires graphical discernment of images. Image identifiers could be obfuscated on the image using captcha techniques, making them discernable only by humans. This means the brute force attack must be perpetrated by a human and cannot be automated. An automated agent could only randomly guess the image identifier. The search space for this brute force attack is $$(r^I)^n$$

Where I is the length of the image identifier, r is the range of the image identifier (26 if it is case insensitive alphabetical, 96 if it is displayable characters), and n is the length of the authentication sequence. A reasonable policy could call for an alphabetical image identifier of length 2. In this case, the brute force search space is:

$$(26^2)^3 = 308,915,776$$

If the captcha obfuscation could be defeated, it is still effectively impossible with the current state of the art for automated processes to recognize the image category from a random image (i.e. recognize a random image of a Ford Mustang® as an automobile). Therefore, automated agents would not be able to perform a systematic brute force attack. They would have to enter random image identifier at each try. This attack would succeed on average after 4096 tries.

The threat from brute force attacks could be further mitigated by implementing a timed lockout policy after unsuccessful logins. A reasonable policy would be to temporarily disable the account for 10 minutes after three unsuccessful logins in a row. On average, the time it would take to succeed with a brute force attack would be:

$$(10\text{ minutes})*(4096-3) = 40930 \text{ minutes} = 28 \text{ days}$$

Furthermore, the size of the image series, the length of the authentication sequence, and the lock out time could be increased to exponentially increase the brute force search time.

Ideally, the present invention may be used in conjunction with a traditional identity authentication paradigm such as username/password as an extra layer of security, thereby increasing the security provided by the overall system.

The present invention is also designed to facilitate advertisement by displaying images, descriptions, and/or references supplied or chosen by advertisers.

The present invention may be extended by replacing the images in the image series with audio, video, or other forms of media or multimedia.

The present invention has a number of embodiments or models within its scope as set forth in detail herein.

The present invention is directed to a method for authenticating identity to a computer system via a portable device. The method comprises the steps of receiving a first login account identifier from a user using a portable device in communication with said computer system, determining if said user is recognized and enrolled from said first login account identifier, generating and displaying a randomly generated series of images on the portable device based on categories, receiving the image identifier the image from the user-selected category, and authenticating identity to said computer system upon validation of the received image identifier. The images have a randomly assigned image identifier and at least one of the images is from a user-selected category.

In another embodiment of the present invention, the invention is directed to a computerized system. The system comprises a portable device and a processor. The portable device comprises a graphical output device and a user input device capable of generating alphanumeric characters. The process is adapted to generate a series of randomly selected images for display on the graphical output device and to assign a different randomly selected unique image identifier to each of the randomly selected images for display with the image on the graphical output device. The images are selected from a plurality of categories. The process is further adapted to receive at least one alphanumeric character from the user input device corresponding to the unique image identifier to authenticate a user of the computerized system.

In yet another embodiment, the invention is directed to a method for authenticating identity to a computer system. The method comprises the steps of receiving an account identifier, displaying a randomly generated series of randomly selected images, each image having at least one randomly generated unique image identifier associated therewith, receiving at least one randomly generated unique image identifier associated with the image from the pre-selected image category, and authenticating identity based upon the received unique image identifier associated with the randomly selected image from the pre-selected category. At least one of the images is from a pre-selected category corresponding to the account identifier.

In still another embodiment the invention is directed to a computer implemented authentication protocol comprising the steps of pre-selecting at least one image category and an account identifier for authentication, displaying a series of randomly selected images on a portable device, each image having a randomly selected unique image identifier associated therewith receiving at least one unique image identifier associated with at least one of the images displayed on the series, and verifying the received unique image identifier corresponds to the at least one pre-selected image category associated with the account identifier. At least one of the images displayed on the series corresponds to the at least one pre-selected image category.

In another embodiment, the invention is directed to a method for verifying a claimed identity of at least one user of a portable device, the method comprising verifying a received unique image identifier which corresponds with a pre-selected image category and permitting access to the computer system when there is a match between the received unique image identifier corresponding to the image from the pre-selected image category to the account identifier. The pre-selected image category and an account identifier are previously selected by the at least one user and stored in a computer system.

In yet another embodiment, the invention is directed to a method for verifying identity of a plurality of users of a computer system utilizing a plurality of portable devices. The method comprises each user pre-selecting an account identifier and at least one image category, generating a series of randomly selected images on at least one of the plurality of portable devices when a user attempts to access the computer system, receiving an input comprising at least one of the unique image identifiers, comparing the at least one image category associated with the received at least one unique image identifier with the account identifier of the user attempting to access the computer system, and permitting the user to access the computer system when there is a match between the at least one image category associated with the at least one received unique image identifier and the at least one image category pre-selected by the user. At least one of the randomly selected images is from the at least one pre-selected image category and wherein each image corresponds to a unique image identifier.

BRIEF DESCRIPTION OF THE DRAWINGS

FIG. 4 illustrates an example of a screen display that would be incorporated as a part of the present invention as shown in FIG. 2 or 3.

DETAILED DESCRIPTION

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

The present invention provides a method and system for user identity authentication to a computer system in which users may select an authentication sequence based on categories during enrollment and recreating the authentication sequence during login by graphically discerning images belonging to the previously selected categories.

Use of portable devices with Internet capability, such as cellular phones and multimedia devices, has increased in recent years. The open access these devices have to computer networks make them especially vulnerable to the security risks outlined herein. Further, they are often used in public, where "shoulder surfing" is a greater concern. Therefore, a way to utilize a series of images to defeat keystroke logging and shoulder surfing on these devices is necessary for secure identification and access to sensitive information on a portable device.

Figure 1:
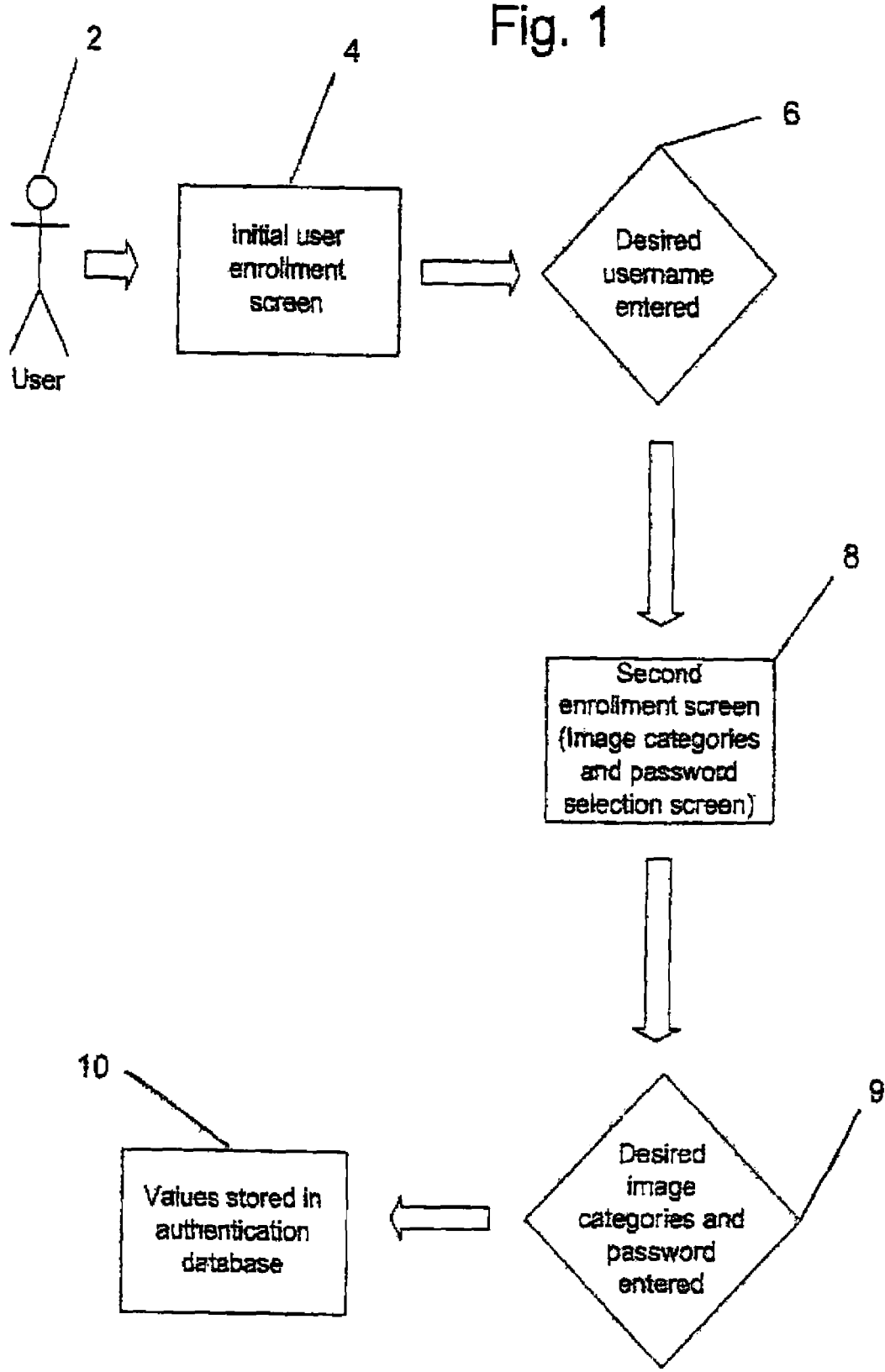
FIG. 1 illustrates a simplified flowchart diagram of an enrollment process used in connection with the present invention directed to a graphical image authentication and security system.

Referring to the drawings in detail, FIG. 1 illustrates a simplified flow chart diagram of an initial enrollment process in order to enroll a user to utilize the present invention. During enrollment, the user shown as 2 will be presented with initial enrollment screen in box 4 where the desired username is entered in diamond 6. After the username is granted, a second enrollment screen in box 8 may be presented to select the traditional password. Next, the user selects at least one authentication category. The authentication information is entered in diamond 9 and stored into the authentication database in box 10.

Figure 2:
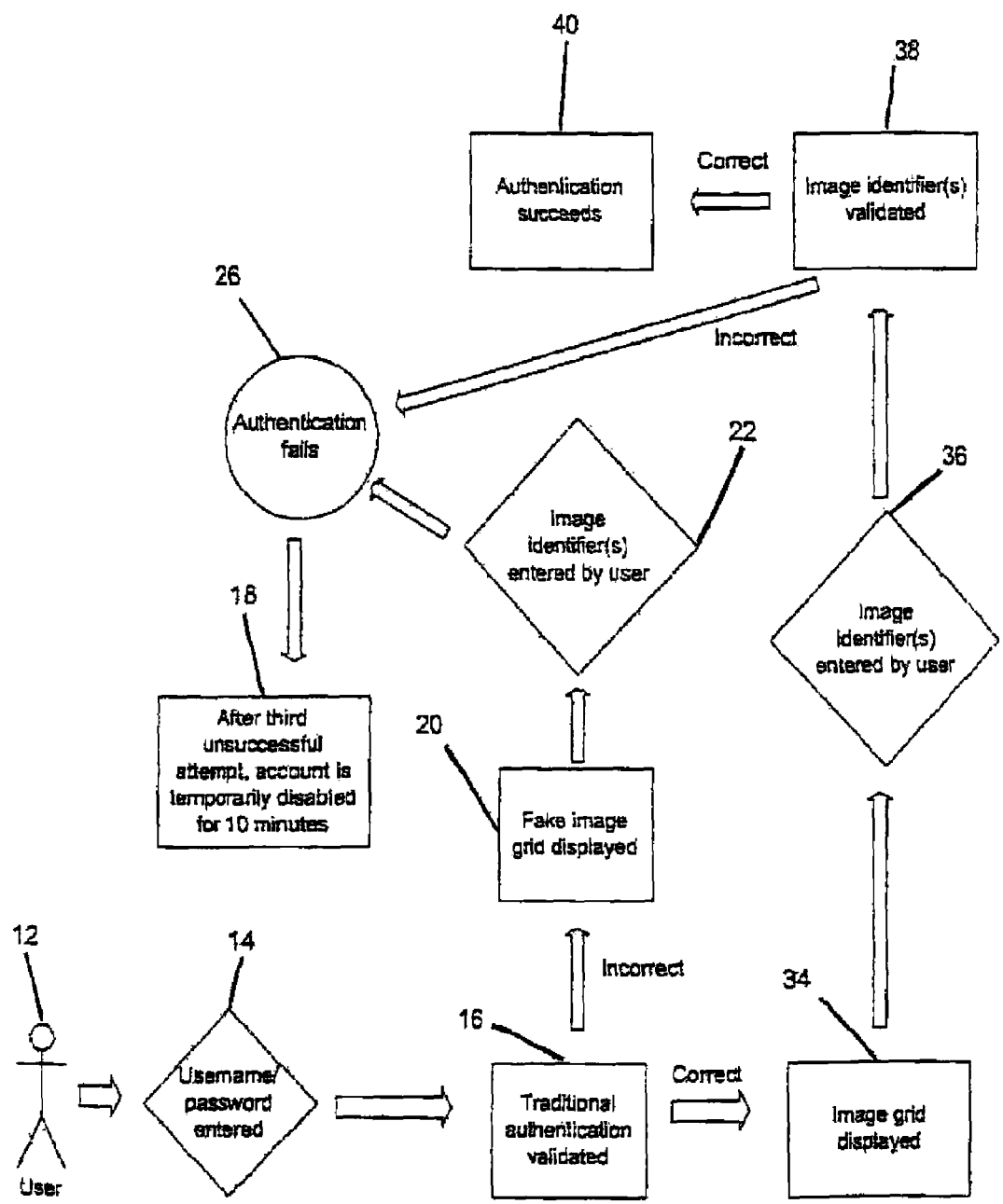
FIG. 2 illustrates a simplified flow chart diagram of a preferred embodiment in accordance with the present invention directed to a graphical image authentication and security system.

FIG. 2 illustrates a simplified flowchart diagram of a preferred embodiment of the present invention. In this embodiment, the Graphical Image Authentication and Security System is shown used in conjunction with a traditional username/password authentication paradigm to increase the overall level of security in a system. The overall process includes a number of discreet steps to authenticate identity to a computer system. By way of example, but not limitation, the computer device operated by the user may include an input device adapted to access a computer system such as a website accessible via the Internet. The device may comprise a laptop personal computer having a central processing unit, a cell phone, music player, personal digital assistant (PDA), tablet PC, gaming unit, etc.

Figure 4:
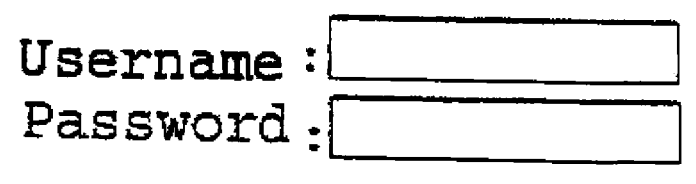
Figure 5:
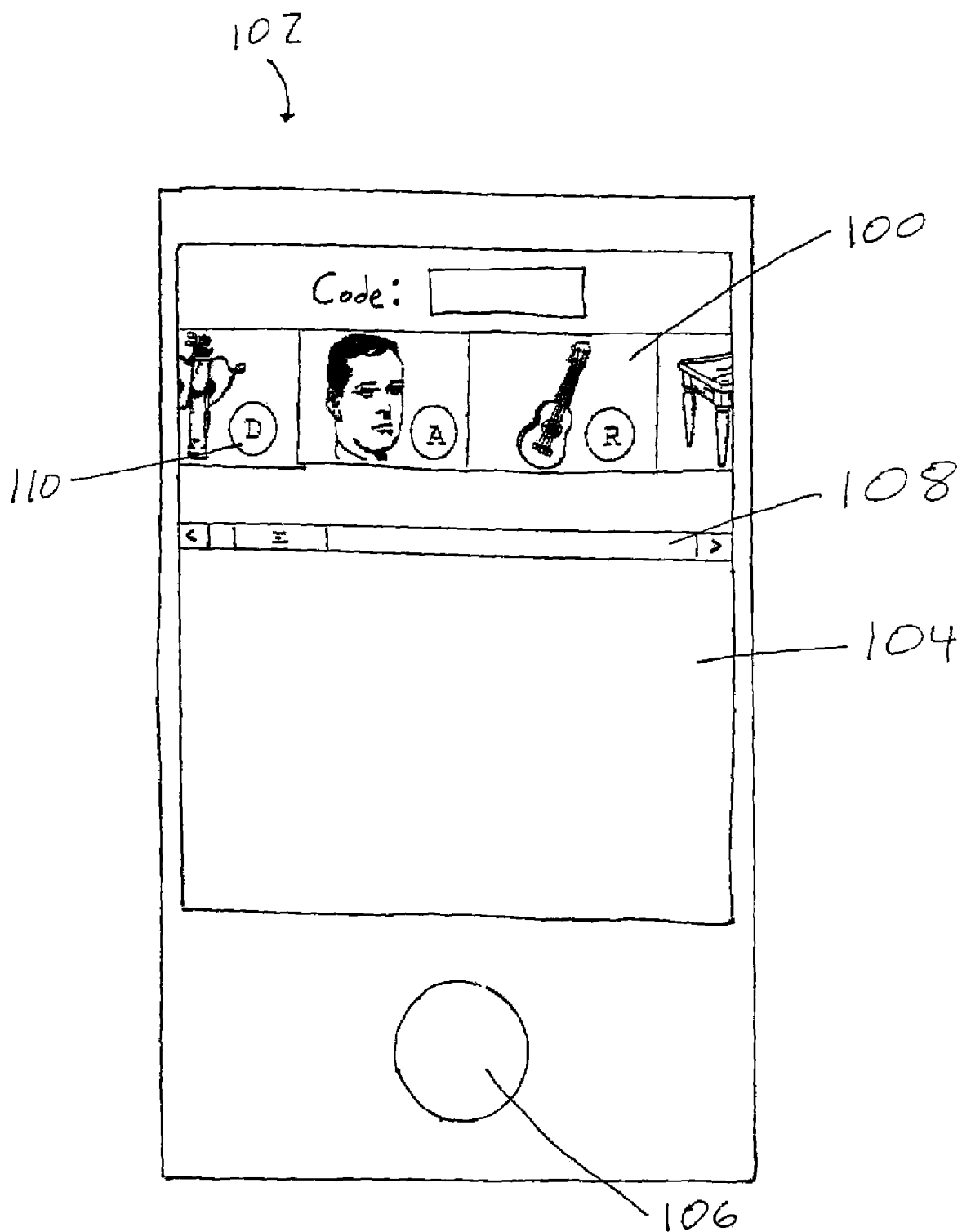
FIG. 5 illustrates an example of a screen display on a portable device that would be incorporated as a part of the present invention as shown in FIG. 2 or 3.

The user 12 will enter a first login account identifier, such as his or her username, and an optional traditional password, represented by diamond 14 in an input device (106 on FIG. 5). By way of example, the user name may be a series of alphanumeric characters, as is well known. By way of example, the password maybe a series of alphanumeric and special characters, as is well known. FIG. 4 shows an example of the traditional username/password login screen.

The username/password is validated in box 16. If the authentication fails because of the username/password entered, a fake series of images that appear normal is displayed as shown at box 20, the user will be able to enter image identifier normally at diamond 22, however any authentication attempt fails as shown at reference numeral 26.

If the username/password pair is authenticated, an image series will be generated and displayed at box 34. As shown on FIG. 5, the cells of the series will display images from different categories. The location of the categories in the series is randomized. The specific image for each category is chosen randomly from a database of images for that specific category. Each image will be overlaid with a unique randomly generated image key. Captcha techniques could be employed to obfuscate the image key so that it is not machine-readable. This would require a human to mediate the login and prevent automated brute force attacks on the authentication process.

The user will select the image on the series according to the at least one preselected category. Optionally, the user may select a plurality of image identifiers corresponding to the user's preselected categories in their authentication sequence by entering the image key overlaid on the images, box 36. The image identifiers are sent to the authentication server for validation, box 38. If the image identifiers are validated, the authentication concludes successfully represented by box 40. If the image identifiers are not validated, authentication fails and the login process must be reinitiated. A timed lockout of 10 minutes as shown by 18 is applied after three unsuccessful logins to mediate the threat from brute force guessing for the authentication sequence.

Figure 3:
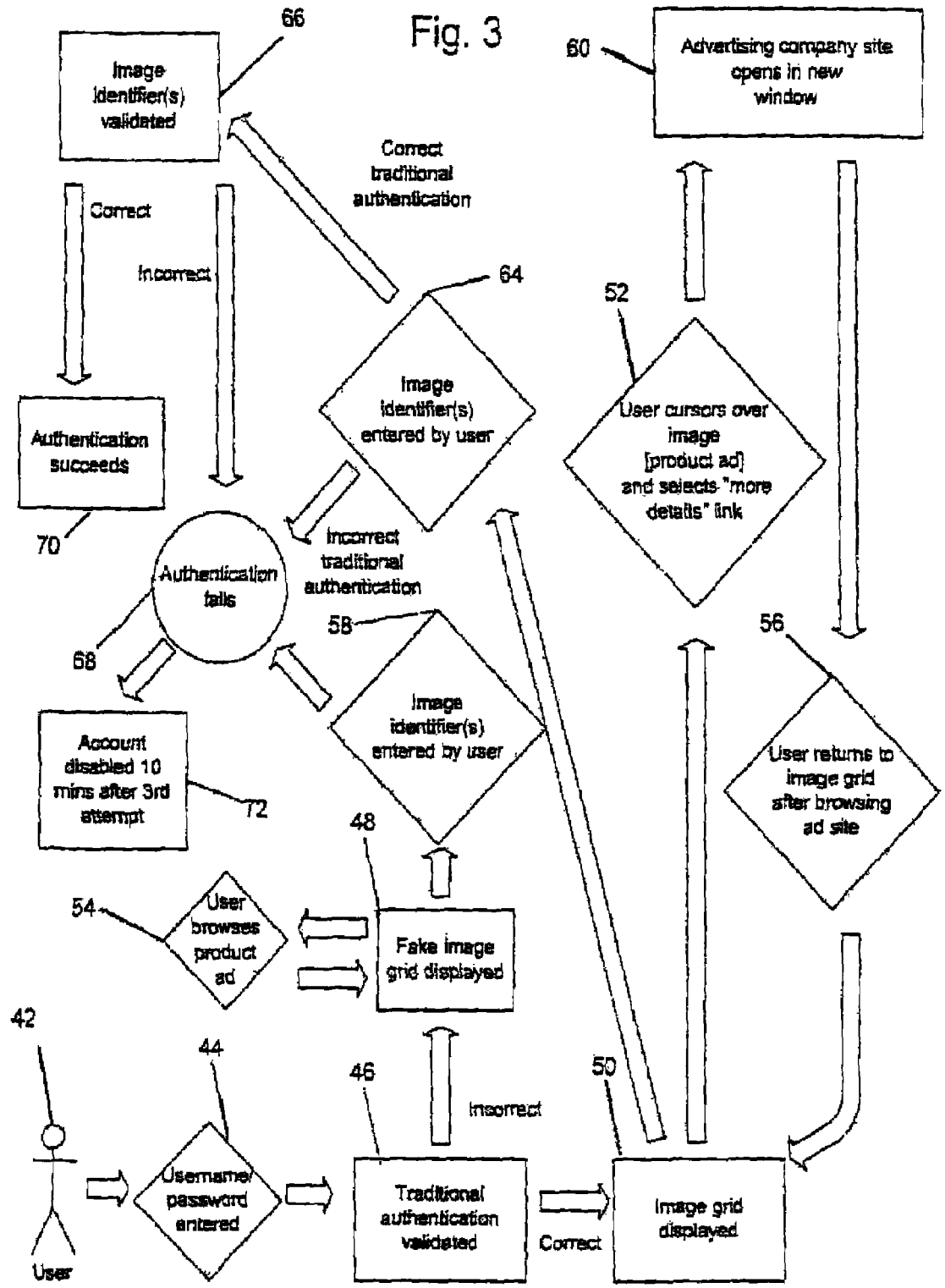
FIG. 3 illustrates a simplified flow chart diagram of an alternate embodiment of the present invention.

FIG. 3 illustrates an alternate embodiment of the present invention that extends the preferred embodiment from FIG. 2 to incorporate advertisements. The enrollment process for this embodiment will be identical to that of the previously described embodiment illustrated in FIG. 1. The login process is also similar to that of FIG. 2.

The user 42 will enter a first login account identifier, such as his or her username, and a traditional password, represented by diamond 44 in an input device such as a keyboard. By way of example, the user name may be a series of alphanumeric characters, as is well known. By way of example, the password maybe a series of alphanumeric and special characters, as is well known. FIG. 3 shows an example of the traditional username/password login screen.

The username/password is validated in box 46. If the authentication fails because of the username/password entered, a fake series of images that appear normal is displayed as shown at box 48, the user will be able to enter image identifier normally at diamond 58, however any authentication attempt fails as shown at reference numeral 68.

If the username/password pair is authenticated, an image series will be generated and displayed at box 50. As shown on FIG. 5, the cells of the series will display images from different categories. The location of the categories in the series is randomized. The specific image for each category is chosen from a database of images for that specific category. Each image will be overlaid with a unique randomly generated image key. Captcha techniques could be employed to obfuscate the image key so that it is not machine-readable. This would require a human to mediate the login and prevent automated brute force attacks on the authentication process.

An ancillary benefit of the present invention stems from the requirement of the user to view each of the visual images to determine which image is in the user's category. Advertising opportunities are presented for advertisers to display products in the array of images. The user cannot ignore the advertising, since the user must view and discern each of the images in order to choose the image category.

The images in the database for this embodiment will contain advertisement images provided by advertisers. The image selected to be displayed on the series will be based on the websites, the advertisement campaigns, and other parameters. The image series displayed in box 48 and 50 will behave identically. The diamond in 54 is abbreviated and embodies 52, 60, and 56. When the user places the cursor over the image as in 52, additional information and links about the advertisement will be provided. If the user chooses to follow an advertisement link, the destination of the link will open in a new window as shown in 60. When the user finishes browsing the advertisement website, the user will return to the log in screen through diamond 58. The user would not need to reenter the username and password after viewing an advertisement link. When the user finishes viewing the advertisement link, the image series is refreshed and displayed again in 48 and 50 respectively.

In the case where the username/password is validated at 50, the user will select the image on the series according to the categories in their authentication sequence by entering the image key overlaid on the images, box 64. The sequence of image identifiers is sent to the authentication server for validation, box 66. If the image identifiers are validated, the authentication concludes successfully represented by box 70. If the image identifiers are not validated, authentication fails at 68 and the login process is reinitiated. A timed lockout of 10 minutes is applied after three unsuccessful logins to mediate the threat from brute force guessing for the authentication sequence as in 72.

As shown in FIG. 5, an image series 100 is shown on a portable device 102. The portable device may comprise a hand-held portable internet access device, such as a cell phone, music player, personal digital assistant (PDA), tablet PC, etc. The portable internet access device 102 is capable of communication of values stored in the authentication database 10 (as shown in FIG. 1). The communication may take place through cellular, satellite, Wi-Fi, Bluetooth, or other connection.

With continued reference to FIG. 5, the internet access device 102 comprises a graphical output device 104 on which the image series 100 is displayed, and a user input device 106. The image series 100 is adapted to scroll across the graphical output device 104. The scrolling can take place across the graphical output device 104 automatically, or can be manipulated by the user using a scroll bar 108, touch screen, input device 106 or other mechanism. The input device 106 may comprise a button as shown in FIG. 5, or a keyboard. However, one skilled in the art will appreciate that the input device 106 could comprise a keyboard capable of generating alphanumeric characters incorporated into the graphical output device 104, as when the graphical output device 104 and input device 106 comprise portions of a touch screen.

In the embodiment of FIG. 5, the user enters his username and optional password as in box 14 (FIG. 2) using the input device 106 and the authentication method takes place as in FIG. 2 or 3. The image series 100 is displayed in box 34 on the graphical output device 104. As discussed above, the image series 100 may scroll automatically or manually, with progress indicated by the scroll bar 108. The correct images from the pre-selected categories are identified by inputting a code corresponding to image identifiers 110, tapping the images using a touch screen, or other means. If the code corresponding to the image identifiers are validated, the authentication concludes successfully, represented by box 70. If the image identifiers are not validated, authentication fails at 68 and the login process is reinitiated.

The input device 106 can be difficult to operate or susceptible to user error when using an internet access device 102 due to the size limitations inherent in such devices. One skilled in the art will appreciate that an embodiment of the present invention which does not utilize the optional password, but only a user name as in box 14 and image identifiers 110 limits the number of character entries required by a user utilizing the input device 106.

Whereas the present invention has been described in relation to the drawings attached hereto, it should be understood that other and further modifications, apart from those shown or suggested herein, may be made within the spirit and scope of this invention.

The invention claimed is:

1. A method for authenticating identity to a computer system via a portable device, which method comprises:
   receiving a first login account identifier from a user using a portable device in communication with said computer system;
   determining if said user is recognized and enrolled from said first login account identifier;
   generating and displaying a randomly generated series of images on the portable device based on categories;
   wherein the images have a randomly assigned image identifier and at least one of the images is from a user-selected category of images, wherein the user-selected category of images is memorized by the user;
   receiving the image identifier assigned to the image from the user-selected category; and
   authenticating identity to said computer system upon validation of the received image identifier.

2. A method for authenticating identity to a computer system as set forth in claim 1 wherein said user-selected image categories are pre-selected by said user or assigned during an enrollment process.

3. A method for authenticating identity to a computer system as set forth in claim 1 wherein said first login account identifier is a username.

4. A method for authenticating identity to a computer system as set forth in claim 1 wherein said at least one image identifier is generated by the user according to one or more image categories pre-selected by said user during an enrollment process.

5. A method for authenticating identity to a computer system as set forth in claim 1 wherein said images include images of products or services sponsored by advertisers.

6. A method for authenticating identity to a computer system as set forth in claim 1 wherein said images embody advertising information and include a reference to additional information.

7. A method for authenticating identity to a computer system as set forth in claim 1 wherein at least one image from said image category is selected or generated.

8. A method for authenticating identity to a computer system as set forth in claim 1 wherein said image is randomly generated.

9. A method for authenticating identity to a computer system as set forth in claim 1 wherein the positions of said image categories within said series are randomly determined.

10. A method for authenticating identity to a computer system as set forth in claim 1 wherein the size of said series is variable.

11. A method for authenticating identity to a computer system as set forth in claim 1 wherein the images include animated images, videos, or other multimedia.

12. A method for authenticating identity to a computer system as set forth in claim 1 further comprising receiving a second account identifier from said portable device in communication with said computer system.

13. A method for authenticating identity to a computer system as set forth in claim 12 wherein said second account identifier is a password.

14. A method for authenticating identity to a computer system as set forth in claim 1 wherein said at least one image identifier requires multiple image identifiers.

15. A method for authenticating identity to a computer system as set forth in claim 1 wherein said portable device comprises a hand-held internet access device.

16. A method for authenticating identity to a computer system as set forth in claim 1 wherein the series of images scrolls on a display screen of the portable device.

17. A computerized system comprising:
a portable device comprising:
a graphical output device; and
a user input device capable of generating alphanumeric characters; and
a processor adapted to generate a series of randomly selected images for display on the graphical output device and to assign a different randomly selected unique image identifier to each of the randomly selected images for display with the image on the graphical output device, wherein the images are selected from a plurality of categories, wherein the plurality of categories comprises an authenticating category of images pre-selected and memorized by a user; and
wherein the processor is adapted to receive at least one alphanumeric character from the user input device corresponding to the unique image identifier to authenticate a user of the computerized system.

18. The system of claim 17 wherein the series of randomly selected images comprise at least one image from a pre-selected image category.

19. The system of claim 17 wherein the series of randomly selected images comprises at least one image of a product or service.

20. The system of claim 17 wherein at least one of the images may further comprise a reference to additional information.

21. The system of claim 17 wherein the randomly selected images may further comprise animation.

22. The system of claim 17 wherein the randomly selected images may further comprise video.

23. The system of claim 17 wherein the processor is further adapted to place at least one of the images on the series in accordance with a predefined occurrence parameter.

24. The system of claim 17 wherein the series of randomly selected images comprises at least four images.

25. The system of claim 17 wherein the randomly selected images are displayed on the graphical output device in the form of tiles.

26. The system of claim 17 wherein each unique image identifier is superimposed over at least a portion of the corresponding image.

27. The system of claim 17 wherein the portable device comprises a phone.

28. The system of claim 17 wherein the portable device comprises a handheld internet access device.

29. The system of claim 17 wherein the randomly selected images are scrolled on the graphical output device.

30. A method for authenticating identity to a computer system, the method comprising:
receiving an account identifier;
displaying a randomly generated series of randomly selected images, each image having at least one randomly generated unique image identifier associated therewith;
wherein at least one of the images is from a pre-selected category selected and memorized by a user and corresponding to the account identifier;
receiving at least one randomly generated unique image identifier associated with the image from the pre-selected image category; and
authenticating identity based upon the received unique image identifier associated with the randomly selected image from the pre-selected category.

31. The method of claim 30 further comprising receiving an authentication parameter corresponding to the account identifier.

32. The method of claim 31 wherein the authentication parameter comprises a password.

33. The method of claim 31 further comprising authenticating identity based upon the received unique image identifier and the authentication parameter.

34. The method of claim 30 wherein receiving at least one randomly generated unique image identifier further comprises receiving a plurality of unique image identifiers in a predetermined sequence.

35. The method of claim 30 further comprising placing at least one of the plurality of images on the series in accordance with a predefined occurrence parameter.

36. The method of claim 30 further comprising superimposing each unique image identifier over at least a portion of the corresponding image.

37. The method of claim 30 wherein at least one of the randomly selected images comprises an advertisement.

38. The method of claim 30 wherein the step of displaying a randomly generated series of randomly selected images comprises the step of scrolling the series of randomly selected images.

39. A computer implemented authentication protocol comprising:
pre-selecting at least one image category and an account identifier for authentication;
displaying a series of randomly selected images on a portable device, each image having a randomly selected unique image identifier associated therewith;
wherein at least one of the images displayed on the series corresponds to the at least one pre-selected image category, the pre-selected image category being memorized by a user seeking authentication;
receiving at least one unique image identifier associated with at least one of the images displayed on the series; and
verifying the received unique image identifier corresponds to the at least one pre-selected image category associated with the account identifier.

40. The computer implemented authentication protocol of claim 39 further comprising pre-selecting an authentication parameter corresponding to the account identifier.

41. The computer implemented authentication protocol of claim 40 further comprising receiving the authentication parameter and verifying the authentication parameter corresponds to the account identifier.

42. The computer implemented authentication protocol of claim 39 wherein the series of randomly selected images comprises at least four images.

43. The computer implemented authentication protocol of claim 39 wherein the at least one unique image identifier comprises at least one alphanumeric character.

44. The computer implemented authentication protocol of claim 39 wherein at least one of the randomly selected images comprises an advertisement.

45. The computer implemented authentication protocol of claim 39 wherein the step of displaying a randomly generated series of randomly selected images comprises the step of scrolling the series of randomly selected images.

46. A method for verifying a claimed identity of at least one user of a portable device, the method comprising:
verifying a received unique randomly assigned image identifier corresponding with a pre-selected image category, wherein the pre-selected image category and an account identifier are previously selected and memorized by the at least one user and stored in a computer system; and
permitting access to the computer system when there is a match between the received unique randomly assigned image identifier corresponding to the image from the pre-selected image category to the account identifier.

47. A method for verifying identity of a plurality of users of a computer system utilizing a plurality of portable devices, the method comprising:
each user pre-selecting an account identifier and at least one image category, wherein the at least one image category is memorized by each user;
generating a series of randomly selected images on at least one of the plurality of portable devices when a user attempts to access the computer system, wherein at least one of the randomly selected images is from the at least one pre-selected image category and wherein each image corresponds to a unique randomly assigned image identifier;
receiving an input comprising at least one of the unique randomly assigned image identifiers;
comparing the at least one image category associated with the received at least one unique randomly assigned image identifier with the account identifier of the user attempting to access the computer system; and
permitting the user to access the computer system when there is a match between the at least one image category associated with the at least one received unique randomly assigned image identifier and the at least one image category pre-selected by the user.

48. The method of claim 47 further comprising allowing at least one of the plurality of users to pre-select an authentication parameter corresponding to its account identifier, wherein the received input from the at least one of the plurality of users further comprises the authentication parameter, the method comprising: permitting the user to access the computer system when there is a match between the at least one image category associated with the at least one received unique randomly assigned image identifier, the image category pre-selected by the user, and between the received authentication parameter and the authentication parameter pre-selected by the user.

49. The method of claim 47 wherein the authentication parameter comprises a password.

50. The method of claim 47 wherein a first user pre-selects a plurality of image categories in a predetermined sequence and wherein the received input comprises a plurality of unique randomly assigned image identifiers, the method further comprising: permitting the first user to access the computer system when there is a match between the sequence of image categories associated with the sequence of received unique randomly assigned image identifiers and the sequence of image categories pre-selected by the user.

51. The method of claim 50 wherein a second user pre-selects an authentication parameter corresponding to its account identifier, wherein the received input from the second user further comprises the authentication parameter, the method comprising: permitting the second user to access the computer system when there is a match between the at least one image category associated with the at least one received unique randomly assigned image identifier, the image category pre-selected by the second user, and between the received authentication parameter and the authentication parameter pre-selected by the second user.

52. The method of claim 50 wherein a second user may pre-select a plurality of image categories in a predetermined sequence and length different from the predetermined plurality of pre-selected image categories of the first user.

53. The method of claim 47 wherein at least one of the randomly selected images comprises an advertisement.

54. The method of claim 47 wherein the step of displaying a randomly generated series of randomly selected images on at least one of the plurality of portable devices comprises the step of scrolling the series of randomly selected images.

55. The method of claim 47 wherein the portable device comprises a hand-held internet access device.

* * * * *